Oct. 26, 1926.
C. H. AU
RECORDER
Filed July 25, 1923
1,604,732
4 Sheets-Sheet 1
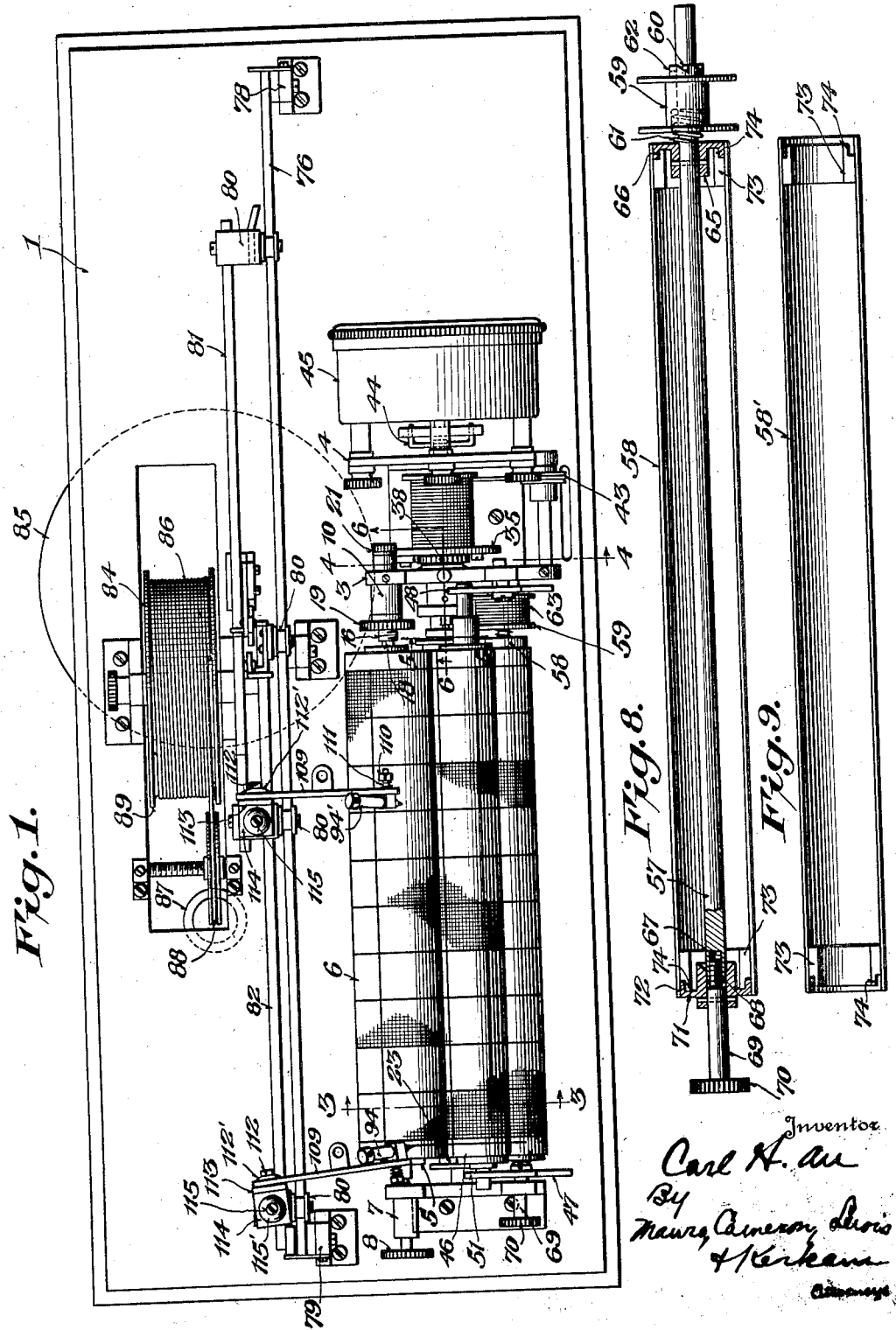

Oct. 26, 1926.
C. H. AU
RECORDER
Filed July 25, 1923
1,604,732
4 Sheets-Sheet 2
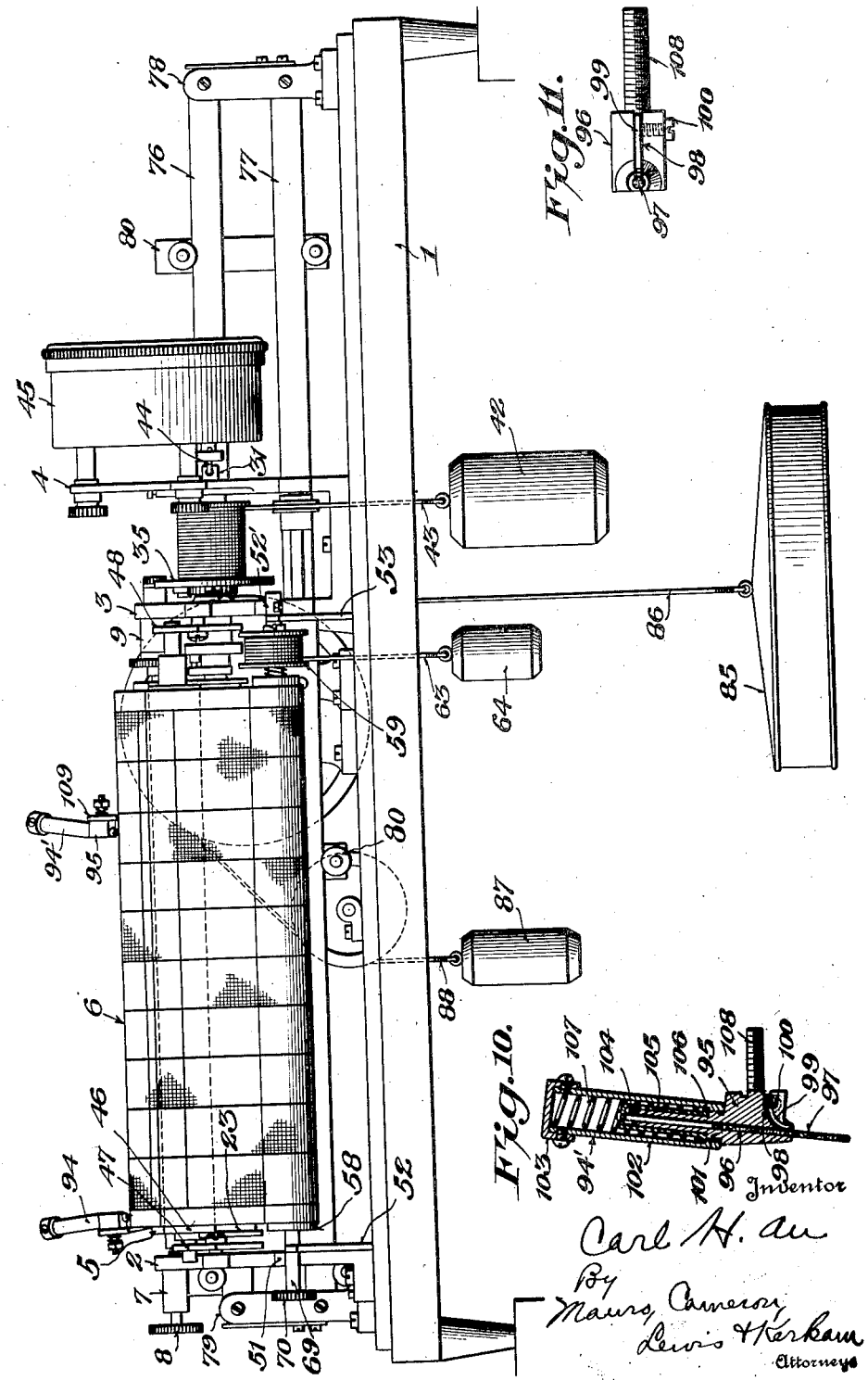

Oct. 26, 1926.
C. H. AU
1,604,732
RECORDER
Filed July 25, 1923    4 Sheets-Sheet 3
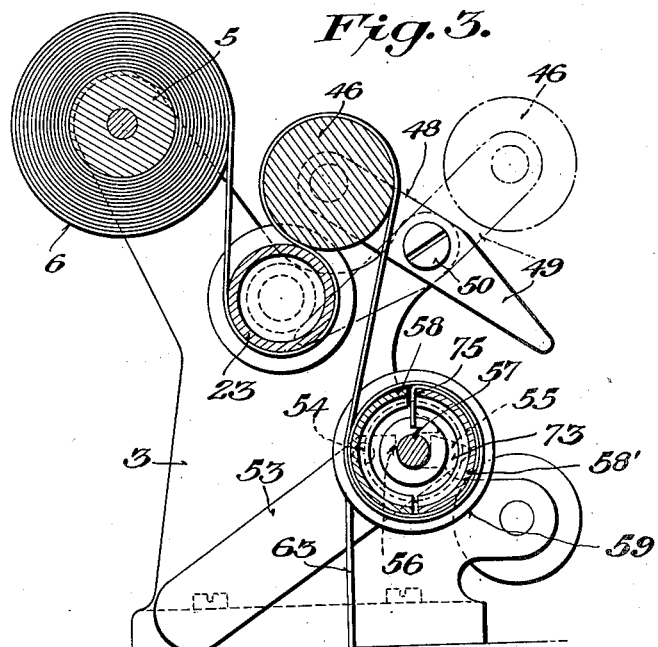
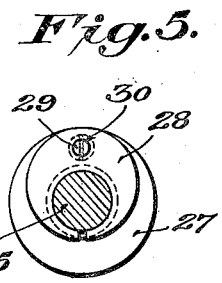
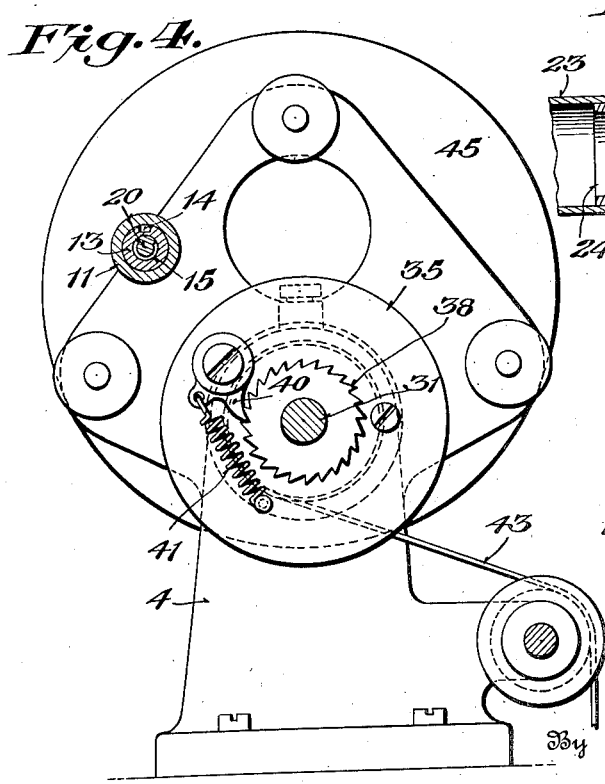
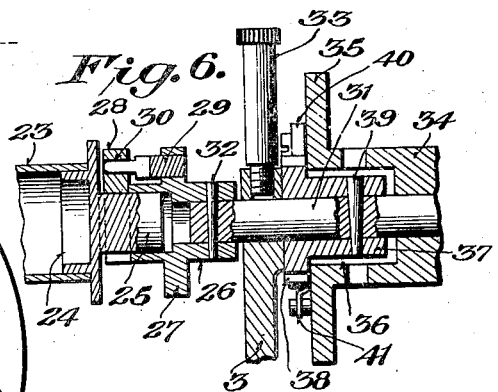
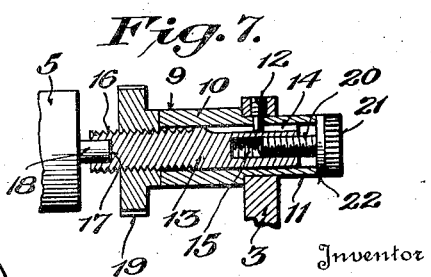

Oct. 26, 1926.

C. H. AU

RECORDER

Filed July 25, 1923    4 Sheets-Sheet 4

1,604,732

Inventor
Carl H. Au
By Mauro, Cameron, Lewis & Kerkam
Attorneys

Patented Oct. 26, 1926.

1,604,732

UNITED STATES PATENT OFFICE.

CARL H. AU, OF WASHINGTON, DISTRICT OF COLUMBIA, ASSIGNOR OF ONE-HALF TO JOHN C. HOYT, OF WASHINGTON, DISTRICT OF COLUMBIA.

RECORDER.

Application filed July 25, 1923. Serial No. 653,779.

This invention relates to recorders, and more particularly to recorders designed for recording a variable force or movement such for example as the stage of a water surface in lakes, rivers and the like, and is an improvement on the construction of recorder shown and described in my application Sr. No. 512,833, filed Nov. 4, 1921, wherein I have shown, described and claimed a so-called "continuous" recorder, that is a recorder designed to operate over an extended period of time without the necessity of frequent inspection, since these recorders are frequently used in localities where they must go without inspection for months at a time.

The object of the present improvement is to simplify the construction and reduce the cost of such recorders while increasing the efficiency and accuracy of operation thereof, and particularly to eliminate as far as possible all danger of the apparatus failing to operate through any cause. Such a failure to operate where inspection is infrequent would necessarily result in a loss of record for a greater or less period of time and as such records are frequently taken over an extended period, say for a year, and form the basis for calculation by engineers of the water flow or the water available during the year, it will be apparent that the loss of a record for any considerable portion of the year would render impossible an accurate calculation, and hence necessitate the loss of an entire year in obtaining the figures necessary for the calculations.

Moreover, recorders of this kind should be such that they can be readily and quickly adjusted by men who are not skilled mechanics and should be free from liability to get out of order, since they are frequently used in remote localities where skilled mechanics and repair parts would be difficult to obtain, and should also eliminate, as far as practicable, possibility of failure on the part of the attendant to have all of the parts in correct operative position and order.

With these objects in view, the invention consists in the combination of elements hereinafter shown and described and defined in the claim. One form which the invention may assume is illustrated in the accompanying drawings, in which—

Figure 12:
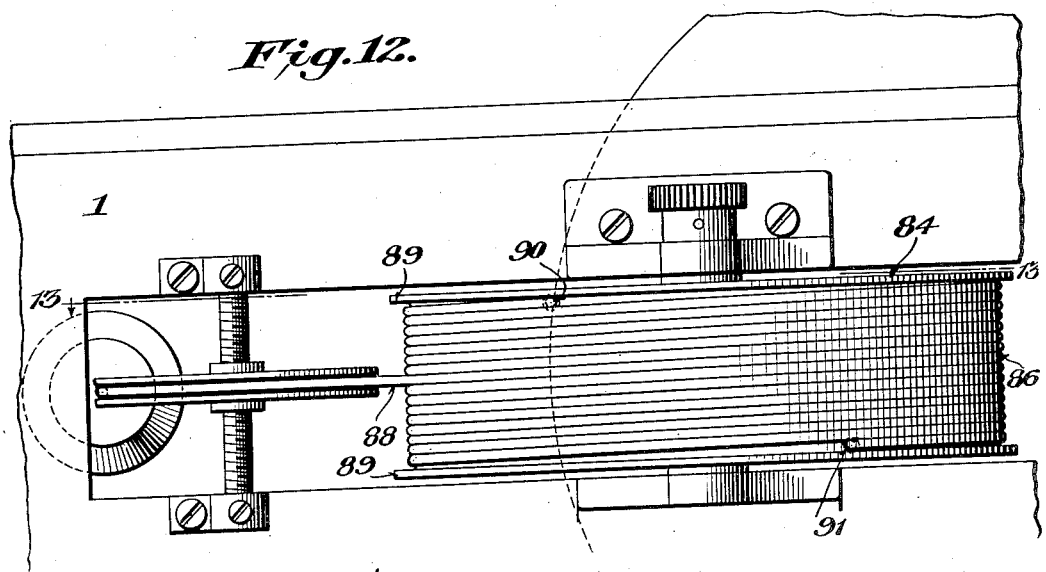
Figure 13:
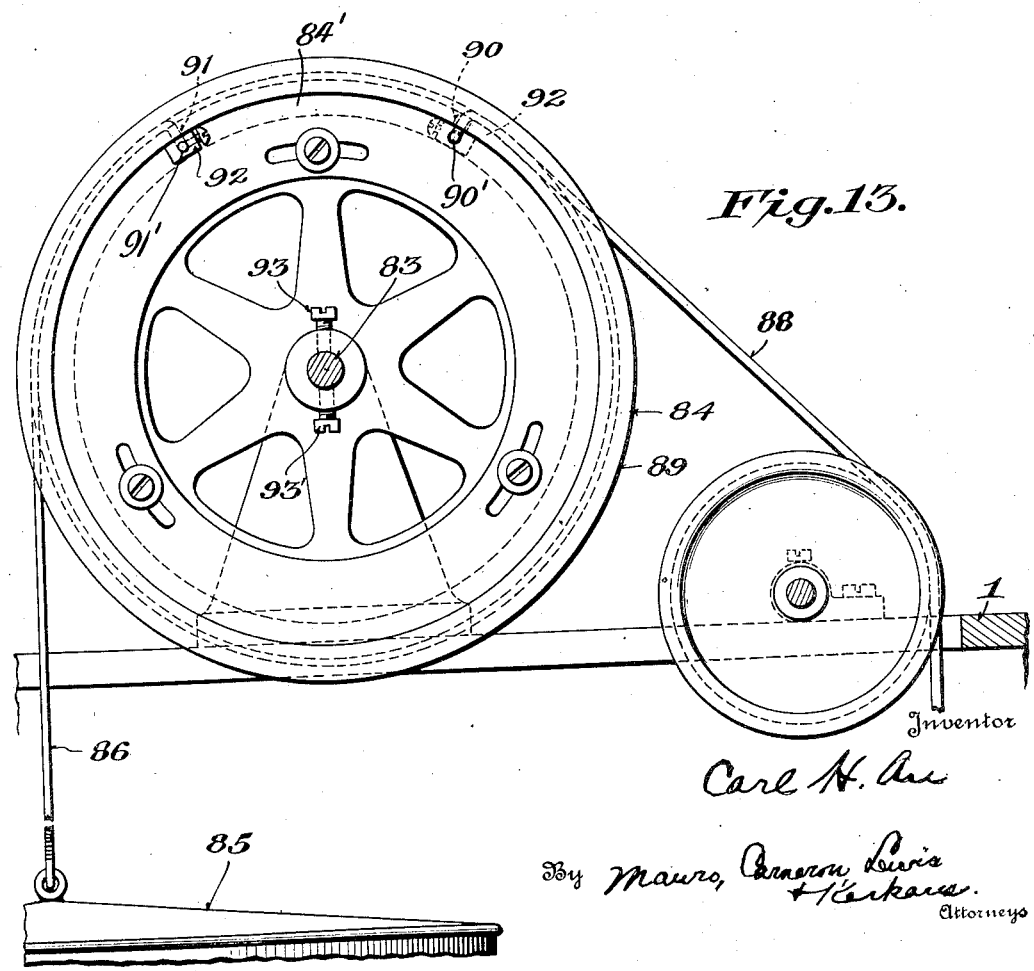

Fig. 1 is a plan view of the recorder;
Fig. 2 is a front elevation thereof;
Fig. 3 is a section on the line 3—3 of Fig. 1, looking in the direction of the arrows;
Fig. 4 is a section on the line 4—4 of Fig. 1, looking in the direction of the arrow;
Fig. 5 is a section on the line 5—5 of Fig. 1;
Fig. 6 is a detail section on the line 6—6 of Figs. 1 and 5;
Fig. 7 is a sectional detail of a cylindrical bearing for the stock-roll;
Fig. 8 is a plan view, partly in section, of the receiving-roll and its operating parts, with one of the twin elements constituting the feed-roll removed;
Fig. 9 is a side elevation of the other twin element of the feed-roll;
Fig. 10 is a sectional view of the recording pencil;
Fig. 11 is a bottom plan view of Fig. 10;
Fig. 12 is a top plan view of the cable-receiving drum forming a part of the recording mechanism; and
Fig. 13 is a section on the line 13—13 of Fig. 12, looking in the direction of the arrow.

Referring to the several figures of the drawings, in which like reference numerals indicate like parts throughout the several views, 1 is a base plate, usually of cast iron, upon which the mechanism of the recorder is mounted. Suitably secured on the base plate 1 are the brackets 2, 3 and 4, the brackets 3 and 4 being preferably formed in a single U-shaped piece as will be clearly understood from an inspection of Fig. 2. The brackets 2 and 3 are provided with upwardly and outwardly projecting arms within which the stock-roll 5 having the record-sheet 6 wound thereon takes bearing. The bearing 7 (Fig. 2) is in the bracket 2 and preferably is an ordinary spring-cone bearing provided with a hand-wheel 8 by means of which it may be retracted when placing the stock-roll in position. Preferably, the bearing 9 of the stock-roll mounted in the bracket 3 is a cylindrical bearing the specific construction of which is shown in Fig. 7, wherein 10 is a cylinder having the reduced end 11 projecting through the bracket 3 and retained in position by a screw 12 passing through the bracket and through an opening in the sleeve. Within the cylinder or sleeve 10 is mounted a rod 13 provided with a longitudinal groove 14 in which groove the projecting end of the screw 12 engages so that the rod 13 is afforded longitudinal movement within the sleeve or cylinder 10 but is restrained from turning movement therein. The rod 13 is internally screw-threaded at 15 and at the opposite ends is externally screw-threaded as shown at 16 and is provided in the externally screw-threaded end with a cylindrical bearing recess 17 within which recess the shaft 18 of the stock-roll 5 takes bearing. A knurled nut 19 engages the external screw-thread 16 and abuts the end of the sleeve or cylinder 10, and 20 is a screw engaging the end of the internal screw-threaded portion of the rod 15 and provided with a knurled head 21 engaging the opposite end of the sleeve or cylinder 10, preferably through the medium of an interposed washer 22.

By manipulating the nut 19 and the screw 20, the rod 13, affording the bearing for the shaft 18 of the feed-roll 5, may be adjusted to the right or the left as will be readily understood. This affords a ready means for adjusting the position of the stock-roll and, as the stock rolls when received from the dealer with the sheet wound thereon may vary slightly in character or in the position in which the record-sheet is wound thereon, this affords a ready means for accurately adjusting the record-sheet to the position desired for recording.

The drive-roll 23 (Fig. 3) has its bearing in the brackets 2 and 3 in a plane below and well in front of the stock-roll. The end which takes bearing in the bracket 2 may be of the usual or any suitable construction, while the end that takes bearing in the bracket 3 is constructed as follows: The roll 23 which preferably consists of a section of brass tubing has a flanged piece 24 projecting therein and suitably secured thereto by brazing or otherwise, and an outwardly projecting cylindrical lug or stub-shaft 25 (Figs. 5 and 6). This stub-shaft enters a cylindrical socket in a socket piece 26 provided with a flange 27. Embracing the stub-shaft 25 is a split elastic piece 28 (Figs. 5 and 6) which frictionally engages the stub-shaft 25 so as to revolve therewith, but which is capable of slipping on the stub-shaft when considerable force is applied to the drive-roll, to the end that the drive-roll may be turned independently of the friction piece. A pin 29 projects from the flange 27 and enters a hole 30 in split piece 28. A shaft 31 enters the socket piece and is pinned therein by taper-pin 32. This shaft passes through and takes bearing in the bracket 3, and also at its extreme end passes through and takes bearing in the bracket 4 (see Figs. 1 and 2), suitable oil cups being provided in each of these brackets, one of the same being shown at 33 (Fig. 6). Mounted to turn loosely on the shaft 31 is a drum 34 provided with a flange 35. The flanged end of the drum 34, that is, the end adjacent to the bracket 3, has a cylindrical recess 36 formed therein, within which recess a hub 37 of a ratchet 38 enters, said hub 37 being pinned to the shaft 31 by a taper-pin 39 inserted through an opening in the drum (see Fig. 6). Pivoted to the flange 35 is a pawl 40 held in engagement with the ratchet 38 by a spring 41.

Referring to Fig. 2, 42 is a weight secured to a cable 43, the other end of which is secured to the drum 34. By grasping the flange 35, which is preferably knurled, the cable 43 may be wound upon the drum without turning the shaft 31, the only connection between the drum and the shaft being through the pawl and ratchet 40—38.

The end of the shaft 31 which projects to the right (Fig. 2) through the bracket 4 is provided with a yoke 44 (see Fig. 1) forming part of a universal joint connection between the shaft 31 and the escapement shaft of the clock-work 45 mounted upon the bracket 4. This combination of the drive roll, its motor and the timing escapement, all in direct alinement and without the intervention of any gearing, is simple, compact and efficient in operation, and aids materially in reducing the cost of construction of the recorder.

Referring to Figs. 1 and 3, 46 is a friction roll which has bearings at its opposite ends in two levers 47, 48. These two levers 47, 48 are loosely pivoted respectively to the brackets 2 and 3. The two levers are similar in construction, and in Fig. 3 the lever 48 is clearly shown as provided with a projecting arm 49 beyond its pivot 50, the length of the arms 49 of the two levers being such that when they are thrown backward or outward, as shown in dotted lines in Fig. 3, the arms 49 will engage the shaft of the drive-roll 23 so that the friction roll 46 will occupy the position shown in dotted lines, Fig. 3.

This friction roll 46, when in operative relation with the drive-roll 23, occupies a position nearly vertical above the roll 23, and said roll 46, for the purpose of securing the adequate amount of friction, is preferably weighted, this being accomplished preferably by filling a brass tube of the desired diameter with lead, though manifestly any other equivalent means for increasing the frictional bearing of the roll 46 might be employed. By weighting the roll, however, simplicity of construction is secured without in any way decreasing the efficiency of the action.

In a plane in front of and considerably below the plane of the drive-roll 23, there are provided in the brackets 2 and 3 two bearings which are open on their outer or front sides, one of the bearings being shown at 51 in the bracket 2 (Fig. 2) and the other being shown at 52' in the bracket 3. Referring to Fig. 3, 53 is a latch pivoted at 54 to the inside of the bracket 3 and provided with a beveled end 55 shown in dotted lines in Fig. 3, and an upwardly opening recess 56 for receiving the shaft 57 of the receiving roll 58. A similar latch is provided on the inner side of the bracket 2. It will be observed that the latches are overweighted, that is, referring to Fig. 3, the end to the left of the pivot point 54 is much heavier than that to the right thereof, so that the latches always automatically assume the position shown in Fig. 3 and act to retain the shaft 57 of the receiving-roll 58 in the otherwise open bearings 51 and 52'. This is due to the fact that the receiving-roll, as shown in Fig. 3, revolves in reverse clockwise direction, and automatically acts to hold the latch closed. But by grasping the knurled wheel 70 and turning the shaft clockwise (Fig. 3) the latches are automatically depressed and the roll comes out of the bearings.

The particular construction of the roll 58 is clearly shown in Fig. 8. It is divided longitudinally in two halves shown at 58 and 58' (Figs. 8 and 9). The shaft 57 projects at the right-hand end thereof, Figs. 1 and 2, beyond the roll 58 and has loosely mounted thereon a drum 59 between a pin 60 projecting through the shaft and the end of the roll 58, a coil spring 61 (Fig. 8) reacting between the end of the roll and a shoulder formed on the interior of the drum to force the drum outward toward the pin 60. The drum has an annular portion 62 projecting therefrom adjacent the pin 60, and this annular portion has formed therein beveled ratchet teeth or notches. When the drum is revolved in one direction, the beveled portions of the notches engage the pin 60, forcing the drum to the left (Fig. 8) against the tension of the spring 61 while the drum is restrained from turning in the opposite direction by the engagement of the squared shoulder of the beveled notches with the pin 60. A cable 63 (Fig. 2) is wound on the drum 59 and has a weight 64 secured to the lower end thereof which weight acts to revolve the drum 59 and with it the shaft 57 and the receiving-roll 58 as will be hereinafter described. The shaft 57 has pinned thereto on the end adjacent the drum 59, a collar 65 provided with an annular inwardly projecting flange 66 concentric with the axis of the shaft 57. The opposite or left-hand end of the shaft 57 (Fig. 8) has a screw-threaded recess 67 formed therein which receives the screw-threaded end 68 of a shaft-extension 69 provided with a knurled end or handle 70. Pinned to the shaft extension 69 is a collar 71 provided with an annular flange 72 corresponding in every respect to the collar 65 and flange 66 on the opposite end of the shaft 57.

The two halves of the receiving-roll 58, 58' are in the form of a cylinder split longitudinally, and soldered, brazed or otherwise secured within the respective ends of these halves are semi-cylindrical collars 73 cut away so as to form semi-cylindrical flanges 74 thereon.

In assembling the roll, screw 68 is withdrawn sufficiently to permit the flanges 66, 72 to engage the flange 74, whereupon the screw 68 is tightened to draw the two collars 65 and 71 toward each other, thereby forcing the flanges 66 and 72 into engagement with the flanges 74 and securely holding the parts together as a complete cylinder with an open slot 75 (see Fig. 3) within which the end of the record-sheet 6 may be inserted when placing said sheet in position for operating the machine.

In thus placing the record-sheet in position, the end is withdrawn from the stock-roll (see Fig. 3), passed downwardly and under the drive-roll 23 and up over the friction roll 46 on the side adjacent the stock-roll, downward from said friction-roll on the side opposite from the stock-roll, to the interior side of the receiving-roll, under said roll, upward and the end inserted in the slot 75. The receiving-roll, when the machine is in operation, is driven in the direction reverse to the hands of a clock, as viewed in Fig. 3, by the action of the weight 64, cable 63 and the drum 59.

By reason of the fact that the friction roll 46 is loosely mounted in bearings which may be thrown so as to remove the friction roll from its action on the drive-roll, and by reason of the further fact that the receiving-roll may be readily removed from its bearings, said roll may be lifted out and the record-sheet cut off, and the record removed from the roll as hereinafter described, the end of the record-sheet again inserted in the slot 75 of the receiving-roll with great facility, the receiving-roll having been first replaced in its bearings by simply pushing it against the beveled portions 55 of the latches 53.

To remove the record from the roll, after the latter has been taken out of its bearings, the shaft-extension 69 is unscrewed and the entire roll, with the record-sheet thereon, is withdrawn longitudinally from the shaft 57, after which the sections 58, 58' are withdrawn one at a time without unwinding the record-sheet.

The record line is made upon the record-sheet while the same is on the stock-roll and, for this purpose, any suitable recording mechanism may be employed. Preferably, however, I employ the recording mechanism corresponding in its general features to that shown and described in my application Sr. No. 512,833 above referred to, which recording mechanism consists of a pair of tracks or ways 76, 77 mounted in standards 78, 79 projecting upward from the base plate 1. On these tracks or ways carriages 80 are mounted to travel, said carriages supporting toothed rack bars 81 and 82 which are engaged in turn by a pair of toothed wheels (not shown) mounted on a shaft 83 (Fig. 13) to which is keyed a drum 84. This drum is turned in one direction by a float 85 secured to a cable 86 passing over and secured to the drum, and in the other direction by a weight 87 secured to a cable 88, also passing over and secured to said drum 84, the cables 86 and 88 passing downward through a slot or opening formed in the table 1.

The drum 84 has formed circumferentially thereon a spiral groove for receiving and guiding the cables, and is provided on either end thereof with flanges 89 (see Fig. 12). A hole 90 (Fig. 12) is provided through the drum adjacent one flange, and a hole 90' through the midrib 84'; and a hole 91 through the opposite flange adjacent a hole 91' in the midrib. The hole 90 (Fig. 12) is for the purpose of receiving the end of the cable 88 and the hole 91 for receiving the end of the cable 86. After the cables are passed through the respective holes in the flanges as shown in Fig. 13, each is passed through the adjacent hole in the midrib and retained in position by a suitable collar 92 suitably clamped to the cable.

The drum 84 is secured to the shaft 83 by two set-screws 93, 93' (Fig. 13). By loosening these set-screws, the drum is readily revolved on the shaft 83 without operating any of the recording mechanism, and in assembling the respective cables 86 and 88 thereon the end of the cable 88 is passed through the opening 91 in the drum and clamped by the collar 92. The drum is then revolved so as to wind cable 88 in the spiral groove on the drum until the entire drum is covered with the cable and the weight 87 is wound up to approximately the position shown in Fig. 2. The cable 86 is then attached to the float 85, which is heavier than the weight 87, and the cable is brought up over the drum and a tension placed thereon by hand approximately equal to the tension placed on the cable by the weight 87. The operator then observes the distance from the then surface of the water upon which the float 85 is resting to the lowest or minimum stage of water in the well or other locality in which it is placed, and measures off on the cable from the drum a length equal to this distance between the present water surface and the minimum or lowest level, and cuts the cable, leaving a small excess of length for the fastening end. He then inserts this end through the openings 90, 90' in the drum and clamps it with the clamp 92. Upon releasing the drum, which during this last operation has been chocked or otherwise prevented from turning, the weight descends, unwinding the cable 88 from the drum and simultaneously winding up the slack portion of the cable 86 thereon until the latter is wound taut, which will occur when the weight of the float 85 becomes effective thereon, and since this float is heavier than the weight the parts will remain stationary. At this point, the operator manually revolves shaft 83 to adjust the recording style to the proper point on the record-sheet and tightens the set-screws 93, 93'. By reason of the fact that there are two of these screws, one of them will always be in a position where it may be readily reached for tightening, and this screw being tightened the drum may be turned sufficiently to render the other of such screws accessible for a like purpose. The parts having been thus secured, any rise or fall of the surface of the water upon which the float 85 rests will cause a corresponding revolution of the drum 84 which is translated into longitudinal movement of the carriages 80.

Mounted on the carriages 80 are two recording styles or pencils 94, 94'. The construction of these pencils is shown in Fig. 10, pencil 94' being illustrated for this purpose, the construction of the two pencils being substantially similar. A metallic block 95 is provided with a longitudinal bore 96 for receiving the recording style or lead 97. The block has a split or kerf 98 (Fig. 11) formed therein and seated in this kerf is a curved piece of spring wire 99 retained in position by a set-screw 100. The curve of the wire 99 is such as to cause it to project slightly into the channel 96 and frictionally engage with a light tension the lead 97, the engagement being sufficient to prevent the lead falling out by its own weight. The block 95 is slightly reduced at 101 and has screw-threaded on said reduced portion a cylinder 102 provided with a cap 103. Within the bore 96 is a headed plunger 104 which bears against the lead 97. Fitting over said plunger and surrounding the upwardly projecting portion of the block 95 is a cylinder 105 closed at one end, its closed end bearing against the head of the plunger 104. Within the cylinder 102 and acting between the cap 103 of said cylinder and an annular shoulder 106 on the cylinder 105 is a spring 107.

As the parts are shown in Fig. 10, the plunger 104 is forced to its lowermost position and the spring 107 is no longer acting to eject the lead 97, and in this condition of the parts, the lead is retained within the block 95 solely by the friction due to the tension of the spring 99.

Projecting laterally from the side of the block 95 is a screw-threaded shank 108 which passes through an arm 109 (Fig. 1) where it is engaged by a nut 110 preferably through a spring 111, interposed between the arm 109 and the nut 110, the construction being such that the pencil 104 may be turned in substantially a vertical plane on the arm 109. This arm 109 is pivoted by a clamp-screw 112 to an upwardly projecting bracket arm 113, the arm 109 being clamped to the bracket 113 through an interposed disk spring 112' to cause it to remain in any position to which it may be adjusted in a vertical plane, but yielding to allow it to be so adjusted by the application of a small force. The upwardly projecting bracket 113 is formed integral with a horizontally projecting portion 114 which is clamped to the carriage by a screw 115 through an interposed disk spring 115' to retain it yieldingly in any position to which it may be adjusted around such screw, but permitting horizontal adjustment around the screw 115.

By this construction it will be readily understood that the arm 109 may be raised or lowered so as to lift the pencil 94' to bring the lead out of contact with the record-sheet or lower it into contact therewith, and also that it may be turned about pivot pin 115 so as to adjust it longitudinally of the record-roll for final adjustment.

One of the difficulties heretofore encountered in structures of this kind has been the liability of the pencil point to become broken and hence fail to trace the record upon the record-sheet. By the construction of pencil shown in Figs. 10 and 11, this is avoided by reason of the fact that should the projecting point of the lead 97 be broken off in any way the spring 107 immediately acts to feed the lead downwardly until it contacts with the roll, when it can be fed no further; and as the record-sheet on the feed-roll is unwound and therefore the diameter of the feed-roll and the paper combined is gradually decreased, spring 107 acts to compensate for this and keep the pencil point in constant contact with the paper. On the other hand, when the attendant raises the pencil from contact with the record-sheet, spring 107 forces the lead outward only until the cylinder 105 contacts at its lower end with the block 95, when spring 107 no longer exerts its tension upon the lead 97, the latter being restrained from dropping out of the block 95 by the tension of the spring 99.

By reason of the manner in which the lead 97 is fed in this pencil, it is extremely desirable that the lead should occupy a position substantially radial to the record-roll. Moreover, as the diameter of this roll constantly decreases as the paper is fed therefrom, it is desirable to maintain this radial position of the lead and this is accomplished by the construction herein shown.

From the foregoing description, it will be perceived that there is provided a recorder of great simplicity of construction, with its elements compactly arranged; that the adjustment of the parts for the initiation of the recording operation can be accomplished with great facility and precision, and that the record may, from time to time, be removed with great facility and without the necessity of unrolling or uncoiling the same, and that, due to the simplicity and compactness of construction before mentioned, the cost of construction of the recorder is reduced to a minimum.

What is claimed is:—

In a recorder for recording a variable force or movement, the combination of a stock-roll on which the record-sheet is wound, a driving roll in a plane below the stock-roll, a tension roll resting by gravity on the driving roll with the record-sheet interposed therebetween, a receiving-roll, driving means for said driving roll, a timing escapement connected to said driving means, independent driving means operatively connected to said receiving roll, and means actuated by the variable force or movement and tracing a record on the record-sheet while on said stock-roll.

In testimony whereof I have signed this specification.

CARL H. AU.